United States Patent [19]

Ellis

[11] 4,111,555
[45] Sep. 5, 1978

[54] APPARATUS FOR MEASURING THE ANGULAR DISPLACEMENT OF A BODY

[75] Inventor: Stafford Malcolm Ellis, Bearstead, England

[73] Assignee: Elliott Brothers (London) Limited, Chelmsford, England

[21] Appl. No.: 766,895

[22] Filed: Feb. 9, 1977

[30] Foreign Application Priority Data

Feb. 24, 1976 [GB] United Kingdom ............... 7229/76

[51] Int. Cl.$^2$ .............................................. G01B 11/26
[52] U.S. Cl. ........................................ 356/141; 356/152
[58] Field of Search ............... 356/141, 152; 350/174, 350/298

[56] References Cited

U.S. PATENT DOCUMENTS

| 3,375,375 | 3/1968 | Abbey et al. | 356/152 |
| 3,827,807 | 8/1974 | Fletcher et al. | 356/141 |
| 3,917,412 | 11/1975 | Stoutmeyer et al. | 356/152 |
| 3,951,550 | 4/1976 | Slick | 356/152 |
| 4,025,192 | 5/1977 | Scholdstrom et al. | 356/152 |

Primary Examiner—S. C. Buczinski
Attorney, Agent, or Firm—Kirschstein, Kirschstein, Ottinger & Cobrin

[57] ABSTRACT

A helmet sight system for use in an aircraft in which the angular displacement of the helmet in the reference frame of the aircraft is measured by measurement of the angular displacement of a set of three non-colinear radiation sources, fixed with respect to the helmet, whose angular positions are sensed by a sensor which is fixed with respect to the coordinate reference frame of the aircraft. The radiation sources may be light emitting diodes and the sensor may comprise an aperture having two mutually inclined rectilinear slits and an array of light sensitive charge coupled devices.

7 Claims, 5 Drawing Figures

APPARATUS FOR MEASURING THE ANGULAR DISPLACEMENT OF A BODY

This invention relates to systems for measuring the angular displacement of an object with respect to a co-ordinate reference frame. It has particular relevance to what has come to be known as helmet sight systems. Such systems detect the line of sight of an observer in a vehicle, typically an aircraft pilot, from a measurement of the position of the observer's helmet. In conjunction with appropriate control means, such a system may be used to enable a pilot to direct a weapon or other device, e.g. a camera, towards a target simply by looking towards that target.

Previous helmet sight systems have resulted in various undesirable restrictions on the pilot or excessive use of the available cockpit space. One system which involves mechanical helmet linkages interferes with the pilot's movement, as do systems which are capable of detecting helmet movement over a small range only since they restrict the pilots use of the system to this range. Systems having a larger detection range have in general required rather bulky apparatus situated in a prominent position in the cockpit which tends to disrupt the general ergonomic situation in the cockpit.

It is an object of the present invention to provide a system for measuring the angular displacement of a body with respect to a co-ordinate reference frame in which above disadvantages are alleviated.

According to the present invention a system for measuring the angular displacement of a body with respect to a co-ordinate reference frame comprises means for emitting radiation from a set of points, at least three of which are non-colinear, fixed with respect to said body, and means fixed with respect to said co-ordinate reference frame for sensing over a range of angular displacement of said body the angular positions of said points with respect to said reference frame, thereby to obtain a measurement of said angular displacement.

In a preferred embodiment said sensing means senses radiation from said set of points at a single viewing position fixed with respect to said reference frame, and said set comprises three points which are equally spaced from each other.

Preferably said sensing means comprises a single sensor arranged to sense the positions of at least two of said points. Preferably radiation is emitted in a predetermined sequence from said at least two points, or radiation of a different frequency is emitted from each of said at least two points so that said single sensor can distinguish between said at least two points.

Preferably said sensing means senses the angular positions of said set of points from two viewing positions from which the fields of view of said points partially overlap. Preferably said system includes two said sets of points.

Said sensing means preferably includes a housing formed with two mutually inclined rectilinear slits and containing a linear array of radiation sensitive elements, said array being spaced from said rectilinear slits and so oriented that in use two laminar radiation beams developed by said rectilinear slits from radiation from a said point, intersect said array, the positions of intersection of said array by said two laminar beams constituting a measure of the angular position of said point about two orthogonal axes.

A preferred application of the invention is for defining the line of sight of an observer relative to a vehicle in which said observer is travelling, in which application said body is a helmet or other head gear for wear by said observer, and in said application there is provided sighting means operative in use to direct said observer to maintain his line of sight in a fixed, predetermined attitude to said helmet or other headgear.

One embodiment of the invention is hereinafter described with reference to the drawings filed with the provisional specification in which:

FIG. 1. is a side elevation view of the system as applied to a helmet sight system in an aircraft;

Figure 1:
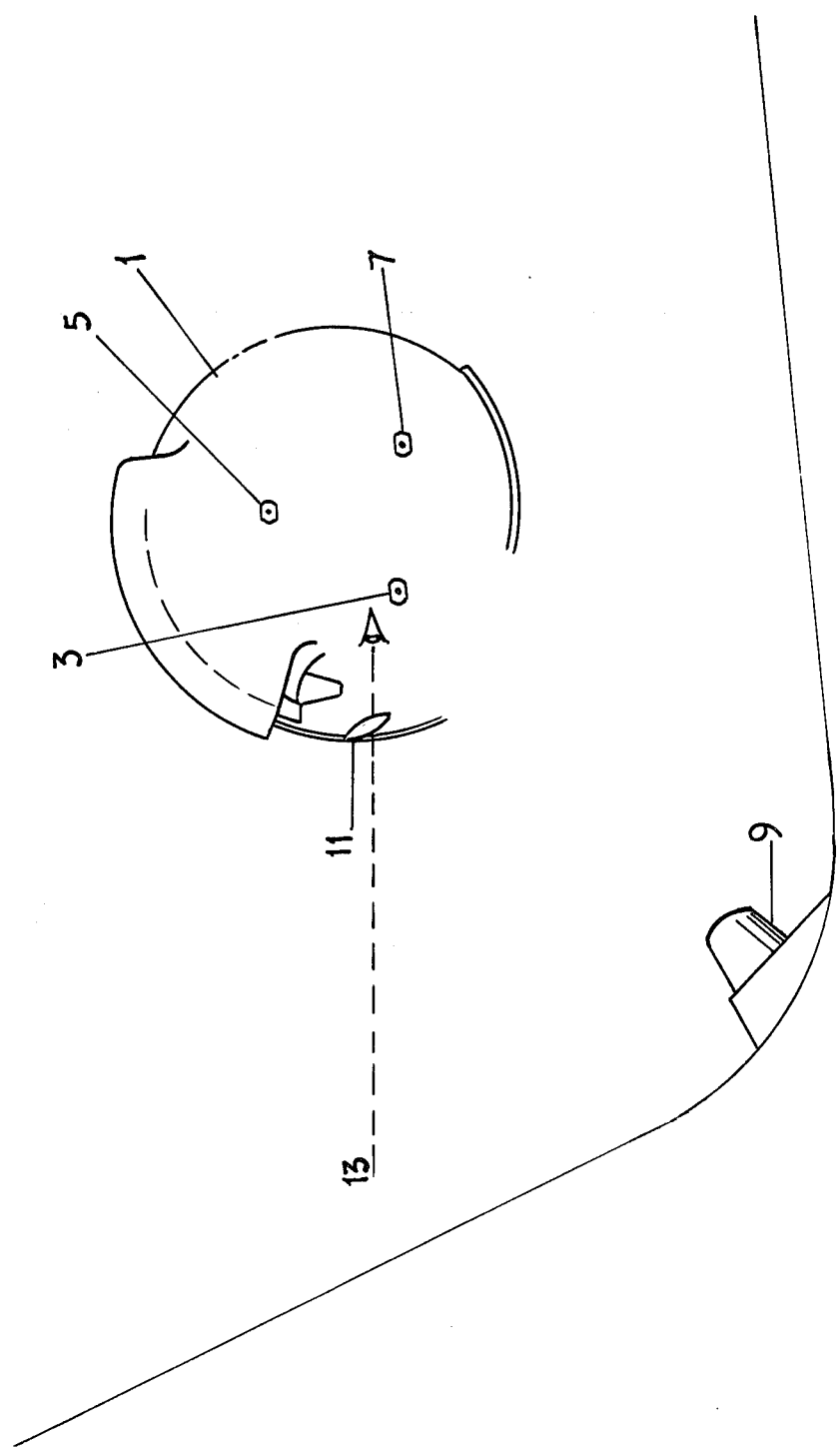
Figure 2:
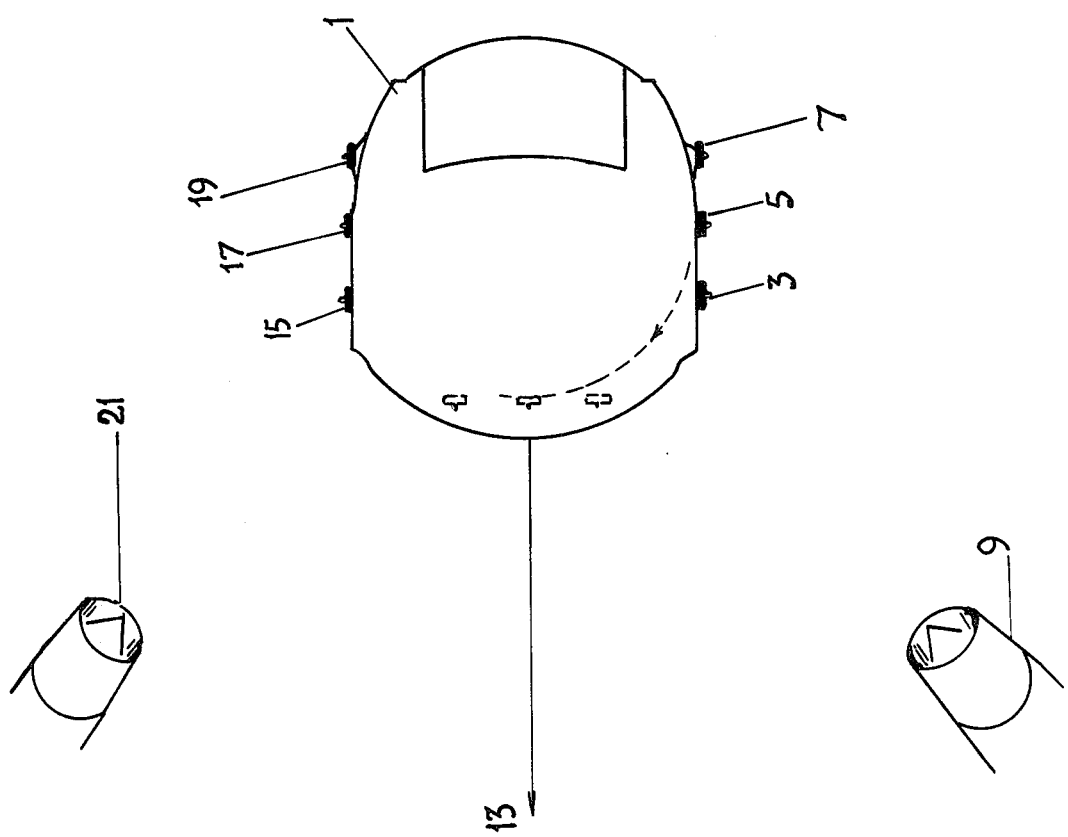
FIG. 2 is a plan view of the system of FIG. 1.
Figure 3:
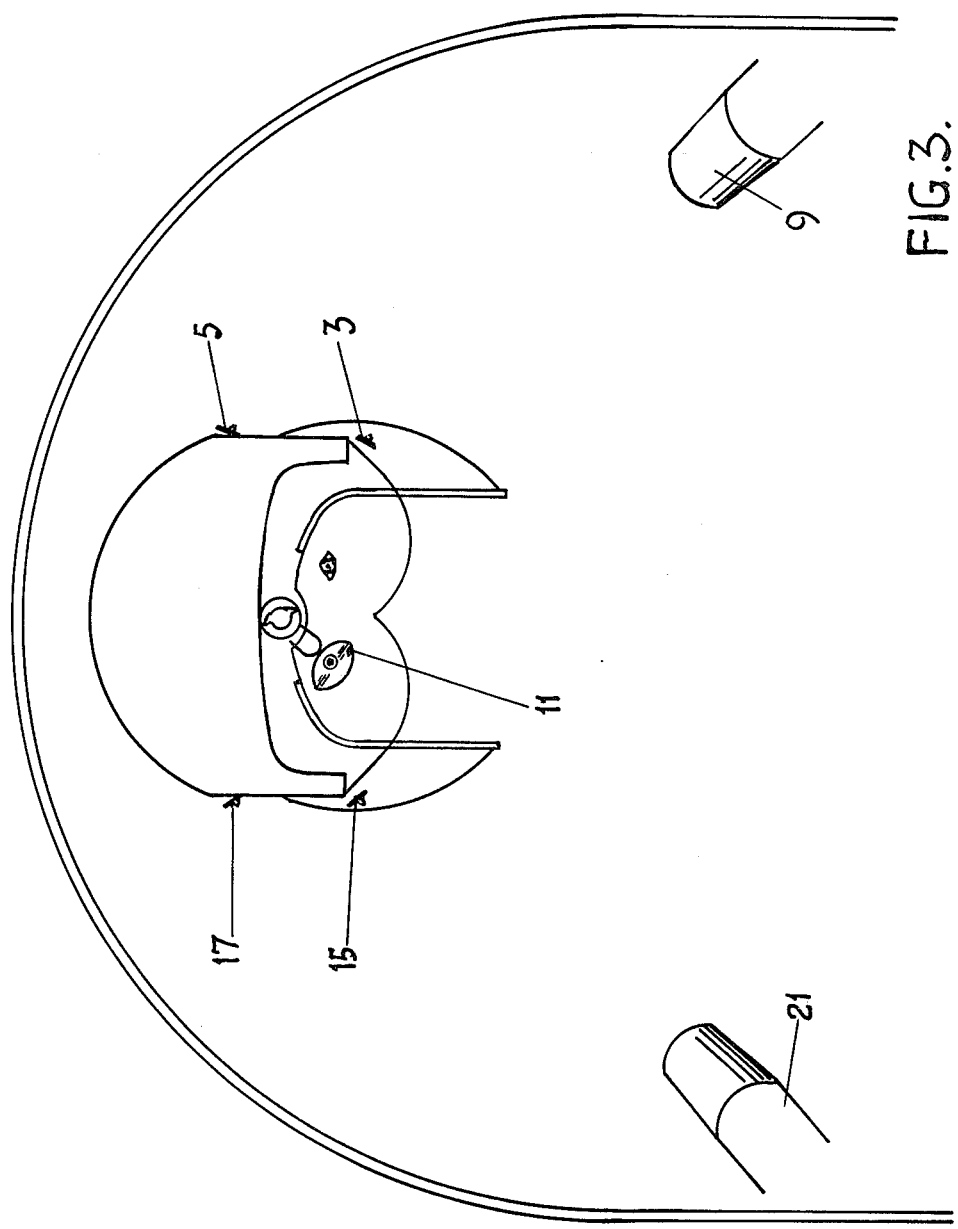
FIG. 3 is a front elevation view of the system of FIG. 1.

Referring to FIGS. 1, 2 and 3, the helmet sight system comprises a helmt 1 for an observer; first, second and third point sources of radiation 3, 5 and 7, which points comprise a first set, carried by the helmet and located thereon at positions to one side of the helmet in an equilateral triangle configuration such that for a range of movement of the head and, hence, of the helmet the first set of points 3, 5 and 7 from which radiation is emitted are within the sensing field of a sensor 9 in front and displaced to one side of the helmet 1.

The helmet also carries sighting means 11 for directing the observer's vision, in use of the system, thus defining a line-of-sight 13 so that any angular change in this line of sight, which is caused by the observer changing his direction of vision, will be reflected in an equiangular change in the helmet position.

The sensor 9, described below, has the first set of three point sources of radiation 3, 5, 7 in its field of view for a limited range of head movements only, since angular displacements of the helmet beyond a certain degree result in the helmet obscuring the sensor's view of the point sources of radiation. Since the head movements of the observer are envisaged as being greater than this limited range a further three radiation emitting points 15, 17, 19, which points comprise a second set, are provided (FIG. 2) situated on the opposite side of the helmet 1 to the first set of points 3, 5 and 7 and in the same equilateral triangle configuration, and a further sensor 21 is provided in a corresponding position to the sensor 9 on the opposite side of the helmet. As shown in FIG. 2 the fields of view of the two sensors 9 and 21 overlap to a certain extent, this overlapping region is conveniently centred about the line corresponding to the line-of-sight of the observer when looking straight ahead.

Considering the system components in more detail, the sources of radiation at the radiation emitting points 3, 5, 7, 15, 17 and 19 are preferably radiation emissive diodes (L.E.Ds) which, when energised emit radiation in the infra-red segment of the spectrum. By virtue of the small dimensions of the diodes they may for all practical purposes be regarded as point sources; at the same time they have a high radiation intensity and these two factors are prime in the application of such diodes to helmet sight systems where definition of source position in a possibly high and variable ambient radiation environment may be required.

Figure 4:
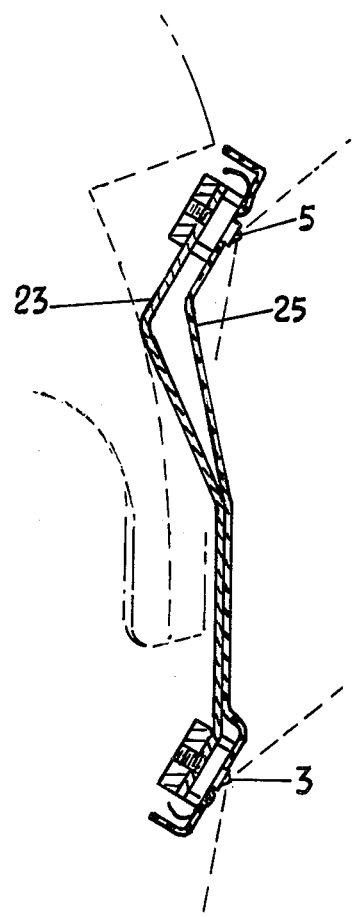
FIG. 4 is a scrap sectional view of part of the system of FIG. 1.

The L.E.Ds. are connected via a mounting bracket 23 covered with an insulating member 25 shown in FIG. 4, the bracket 23 being constructed to hold the L.E.Ds. at a small angle to the helmet surface so that when the helmet is in an upright position the L.E.Ds point downwards towards the sensors thus making the central-axis of the cone of radiation emitted by each L.E.D. nearer the centre of the fields of view of the sensors when the helmet is in an upright position. This angulation of the L.E.Ds. thus causes the L.E.Ds to be in the fields of view of the sensors for most of the envisaged movements of the helmet since such movements are not likely to contain large angular displacement from the upright position.

Figure 5:
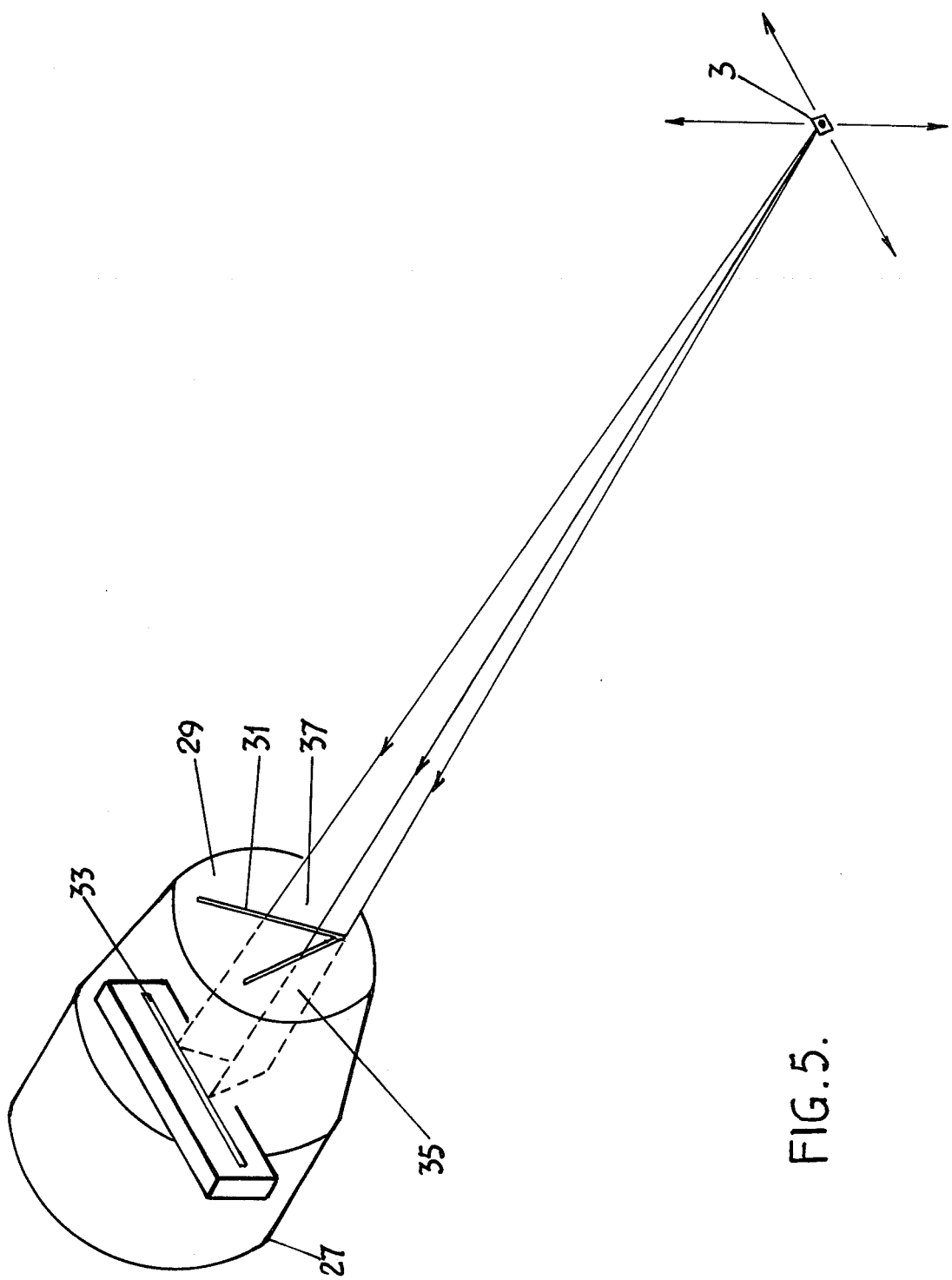
FIG. 5 is a pictorial representation of a sensor used in the system of FIG. 1.

Referring to FIG. 5, each sensor 9 or 21 has a housing 27 having a conical forward end which is truncated to give a radiation receiving face 29. This face is composed of an outer glass protective plate, a filter element transmissive to radiation in the near infra-red portion of the spectrum, and an inner plate having a surface which is opaque save for V-shaped aperture 31.

Within the housing 27 there is a linear array 33 of substantially contiguous light sensitive elements, which are preferably light-sensitive charge-coupled devices. The surface density of the elements and the extension of the array depend on the required accuracy and field of view of the sensor.

Radiation from one of the L.E.Ds, shown in FIG. 5 for example L.E.D. 3, that is incident on the face 29 of the sensor is transmitted only where it is incident on the V-shaped aperture 31.

Two mutually inclined laminar beams 35 and 37 are produced from the incident radiation from the L.E.D. and emerge from the limbs of the V-shaped aperture 31 to intercept and to be intercepted by the linear array 33.

Angular movement of the L.E.D. 3 about an axis through the sensor 9 perpendicular to the axis of symmetry of the V-shaped aperture 31 in the plane of the face 29 causes the inclined laminar beams 35 and 37 to intercept the array 33 at positions which approach and retreat from one another depending on the sense of the angular movement and to an extent determined by the amplitude of such angular movement. Angular movement of the L.E.D. 3 about an axis through the sensor 9 parallel to the axis of symmetry of the V-shaped aperture 31 in the plane of the face 29 causes the inclined laminar beams 35 and 37 to move in unison in one direction or other along the array 33 depending on the sense of movement of the L.E.D. and the amplitude of such movement.

The angular movement of the L.E.Ds which is sensed by the sensors 9 and 21 is with respect to co-ordinate axes of the snesors. Since however, the sensors are fixed in the aircraft, the angular positions of the L.E.Ds with respect to a co-ordinate reference frame of the aircraft may be ascertained by a simple transformation, suitably carried out by calibrating the sensors initially so that they bear a known relationship to the co-ordinate reference frame of the aircraft.

The sensing of the angular displacement of the helmet 11 has been described with reference to a single L.E.D., but it is necessary for a single sensor to sense the angular positions of all three L.E.Ds of a set presented to it in order to establish the angular displacement of the helmet. This is so because with less than three L.E.Ds presented to a single sensor there is always an axis of rotation about which the helmet may rotate without altering the positions of the L.E.Ds, and such rotation will go undetected.

In the present embodiment the sensors 9 and 21, sense the angular position of one L.E.D. only at one time, and it is necessary to distinguish the particular L.E.D. being sensed. The L.E.Ds of each set are therefore illuminated in a predetermined sequence, the period of which sequence is small enough to avoid the likelihood of there being a significant change in the position of the helmet during the time taken to sense all three L.E.Ds of one set in turn.

It will be appreciated that identification of the L.E.Ds may be made by other means, for example having each L.E.D. emit radiation of a different frequency.

It will be appreciated too, that the condition that the angular positions of at least three L.E.Ds must be sensed in order to determine the angular displacement of the helmet may be satisfied by using alternative arrangements to having one sensor sense three L.E.Ds, for instance, one L.E.D. may be positioned on one side of the helmet sensed by one sensor, and two L.E.Ds may be positioned on the other side and sensed by a second sensor.

I claim:

1. A system for defining the line of sight of an observer relative to a vehicle in which said observer is traveling by measuring the angular displacement of headgear worn by said observer with respect to a coordinate reference frame, said system comprising:
   A. means for emitting radiation from
      i. two sets of points
      ii. of at least three non-colinear points per set,
   B. said two sets of points being fixed with respect to said headgear; and
   C. means for sensing, independently at each of two viewing positions, the angular positions of a set of points respectively associated with each viewing position and with respect to said reference frame over a range of angular displacement of said headgear,
      i. said viewing positions being fixed with respect to said coordinate reference frame, and
      ii. the fields of view from said two viewing positions being different and partially overlapping,
   D. thereby to obtain a measurement of said angular position and so to define the line of sight over a wide range of angular movement of said headgear.

2. A system according to claim 1 wherein the overlapping region of the fields of view of said two viewing positions is centered about a line corresponding to the line-of-sight of the observer when looking straight ahead.

3. A system as claimed in claim 1 wherein each said set comprises three points which are equally spaced from each other.

4. A system as claimed in claim 1 wherein radiation is emitted in a predetermined sequence from said points so that said sensing means can distinguish between said points.

5. A system as claimed in claim 1 wherein radiation of a different frequency is emitted from each of said points so that said sensing means can distinguish between said points.

6. A system as claimed in claim 1 wherein said sensing means includes a housing formed with two mutually inclined rectilinear slits and containing a linear array of discrete radiation sensitive elements producing discrete outputs, said array being spaced from said rectilinear slits and so oriented that in use two laminar radiation beams developed by said rectilinear slits from radiation from a said point simultaneously intersect said array, the positions of intersection of said array by said two laminar beams constituting a measure of the angular position of said point about two orthogonal axes.

7. A system as claimed in claim 1 wherein there is provided sighting means operative in use to direct said observer to maintain his line of sight in a fixed, predetermined attitude to said headgear.

* * * * *